United States Patent
Morita et al.

(10) Patent No.: US 9,720,857 B2
(45) Date of Patent: Aug. 1, 2017

(54) DISTRIBUTED I/O CONTROL SYSTEM, DISTRIBUTED I/O CONTROL METHOD, AND MASTER STATION AND SLAVE STATION FOR DISTRIBUTED I/O CONTROL SYSTEM

(75) Inventors: Keisuke Morita, Chiyoda-ku (JP); Hiroyuki Tsuji, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 204 days.

(21) Appl. No.: 14/424,835

(22) PCT Filed: Sep. 4, 2012

(86) PCT No.: PCT/JP2012/005578
§ 371 (c)(1),
(2), (4) Date: Feb. 27, 2015

(87) PCT Pub. No.: WO2014/037970
PCT Pub. Date: Mar. 13, 2014

(65) Prior Publication Data
US 2015/0220459 A1    Aug. 6, 2015

(51) Int. Cl.
G06F 13/38     (2006.01)
G06F 13/12     (2006.01)
(Continued)

(52) U.S. Cl.
CPC ........ *G06F 13/128* (2013.01); *G06F 13/1663* (2013.01); *G06F 13/364* (2013.01); *H04L 12/4035* (2013.01)

(58) Field of Classification Search
None
See application file for complete search history.

(56) References Cited

U.S. PATENT DOCUMENTS 4,057,785 A * 11/1977 Furniss ............... H02J 13/0055
                                                340/3.32
4,939,725 A    7/1990 Matsuda et al.
(Continued)

FOREIGN PATENT DOCUMENTS

JP    1 241997    9/1989
JP    2 1649      1/1990
(Continued)

OTHER PUBLICATIONS

International Search Report Issued Oct. 2, 2012 in PCT/JP2012/005578 Filed Sep. 4, 2012.
(Continued)

*Primary Examiner* — Ilwoo Park
(74) *Attorney, Agent, or Firm* — Oblon, McClelland, Maier & Neustadt, L.L.P.

(57) ABSTRACT

In a distributed I/O control system updating data through a network between a shared memory of a slave station performing input/output of data with plural input or output devices and a shared memory of the master station corresponding to the slave station's shared memory, the master station sets group information with respect to the input or output devices, and outputs, according to a cycle table, an input request frame specifying the shared memory in the slave station and the group information, and the slave station performs input/output of data with plural input or output devices, and determines whether an input request content specified by an input request frame from the master station is all information in the shared memory in the slave station, or information corresponding to the group information, to thereby transmit output data according to the input request content.

8 Claims, 12 Drawing Sheets

(51) Int. Cl.
*G06F 13/16* (2006.01)
*G06F 13/364* (2006.01)
*H04L 12/403* (2006.01)

(56) References Cited

U.S. PATENT DOCUMENTS

| | | | | |
|---|---|---|---|---|
| 2003/0149784 A1* | 8/2003 | Ide | ............ | H04B 3/542 |
| | | | | 709/231 |
| 2005/0240666 A1* | 10/2005 | Xu | ............ | H04L 12/24 |
| | | | | 709/223 |
| 2006/0155816 A1 | 7/2006 | Umei et al. | | |
| 2008/0185447 A1* | 8/2008 | Kim | ............ | F24F 11/006 |
| | | | | 236/51 |
| 2013/0343360 A1* | 12/2013 | Poovendran | ......... | H04W 4/006 |
| | | | | 370/336 |
| 2015/0220459 A1 | 8/2015 | Morita et al. | | |

FOREIGN PATENT DOCUMENTS

| | | |
|---|---|---|
| JP | 7 162971 | 6/1995 |
| JP | 11 163907 | 6/1999 |
| JP | 2010 287959 | 12/2010 |
| JP | 2011 109491 | 6/2011 |
| WO | 2004 059931 | 7/2004 |

OTHER PUBLICATIONS

U.S. Appl. No. 14/762,305, filed Jul. 21, 2015, Tsujimura, et al.

* cited by examiner

DISTRIBUTED I/O CONTROL SYSTEM, DISTRIBUTED I/O CONTROL METHOD, AND MASTER STATION AND SLAVE STATION FOR DISTRIBUTED I/O CONTROL SYSTEM

TECHNICAL FIELD

The present invention relates to a distributed I/O control system and a control method therefor.

BACKGROUND ART

An in-vehicle system provided to a car is taken as an example. In the in-vehicle system, plural ECUs (Electronic Control Units) are each connected with a network, and I/O (I/O: INPUT/OUTPUT) devices for communicating with one of the plural ECUs are connected through a dedicated signal line. The one of the ECUs controls the I/O devices. In such an in-vehicle system, there has been a problem that as the number of I/O devices to be controlled increases, the number of dedicated signal lines connected to an ECU increases.

In order to solve the problem, Patent Document 1 discloses a method in which dedicated signal lines for the respective I/O devices are accommodated in any one of multiplex transmission devices installed in various portions of the vehicle, and the multiplex transmission devices are connected therebetween and to the ECUs, through multiplex transmission lines. However, in a case where plural ECUs are connected, the multiplex transmission lines are used not only for connecting a single ECU and the multiplex transmission devices, but also for connecting other plural ECUs to exchange data between ECUs and the like. Furthermore, because the data exchanged between the ECUs is utilized for controlling a moving car, a predetermined level of real time performance is required.

Furthermore, Patent Document 2 discloses a method in which in a communication system between a master station and plural slave stations (corresponding to the multiplex transmission devices), the plural slave stations are divided into groups according to their communication cycles, and the master station transmits a frame specifying a group to handle, to thereby communicate only with the specified group.

PRIOR ART DOCUMENT

Patent Document

Patent Document 1: Japanese Patent Laid-Open Publication No. H02-1649
Patent Document 2: Japanese Patent Laid-Open Publication No. 2010-287959

SUMMARY OF THE INVENTION

Problem to be Solved by the Invention

In a communication system which is for a master station and plural slave stations with plural I/O devices connected thereto and whose multiplex transmission lines connected to the stations are in a state in which communication between another master station and slave stations is generated, it is necessary that an input data change in an I/O device is quickly reported, and it is also necessary that data transmission from the slave stations to the master station is suppressed so as to ensure the real-time level described above. More specifically, it is necessary that a communication band from the slave stations to the master station is suppressed below a certain level so that other devices can communicate.

In a system where input data is transmitted from a slave station to a master station every time when the input data changes, it is necessary that the communication band is always assigned to a multiplex transmission device in order to address a situation in which input data changes occur concentratedly during a certain period. Furthermore, because I/O devices requesting various communication cycles are connected to the slave station, there is a problem that a system in which the slave station is specified according to a communication cycle cannot deal with the communication cycles requested by the I/O devices. Therefore, a sufficient communication band cannot be ensured for other devices using the multiplex transmission line.

In view of these situations, the present invention mainly aims to realize a configuration which deals with communication cycles requested by the communication equipment while suppressing the communication band, and transmits specific data without delay.

Means for Solving Problem

In order to solve the problems described above and achieve an objective, a distributed I/O control system updates data through a network between shared memory of a slave station performing input and output operation of data with a plurality of input or output devices and a shared memory of a master station corresponding to the slave station's shared memory, the distributed I/O control system comprises: the master station comprising: a cycle table in which a communication cycle and group information are defined with respect to each of the input devices or the output devices; an input request transmitter that outputs, according to the communication cycle, an input request frame specifying the shared memory of the slave station and the group information; and a reproducer that reproduces, when input data inputted from the network is specified by the group information, data to be inputted to the shared memory of the master station, and the slave station comprising: a transmission data selector that determines whether an input request content specified by the input request frame from the master station is all information in the shared memory in the slave station, or information corresponding to group information, and issues a command to transmit the corresponding output data; and a compressor that compresses, when output data from the shared memory in the slave station is specified by the group information, the output data into data to be inputted to the shared memory of the master station.

Effect of the Invention

The distributed I/O control system according to the present invention has an effect that the distributed I/O control system can deal with communication cycles requested by input devices or output devices connected to the slave stations, and the communication band of the multiplex transmission line can be suppressed.

BRIEF DESCRIPTION OF THE DRAWINGS

FIG. 1-2 is a configuration view of a slave station 300 of the distributed I/O control system in Embodiment 1;

FIG. 2 is a view for explaining shared memories 101 and 301 in Embodiment 1;

FIG. 9-1 is a configuration view of a master station 100 of a distributed I/O control system in Embodiment 3;

FIG. 9-2 is a configuration view of a slave station 300 of the distributed I/O control system in Embodiment 3.

MODES FOR CARRYING OUT THE INVENTION

Embodiments of a distributed I/O control system according to the present invention will be explained below in detail, using figures. In addition, the present invention is not limited to the embodiments.

Embodiment 1

In Embodiment 1, explanation will be made about a system having a mechanism in which a master station transmits an input request to plural slave stations connected to I/O devices and then a slave station transmits to the master station, input data from an I/O device corresponding to the input request, and in which the input data belongs to a shared memory or a data group referred to as a group, and the master station makes an input request by specifying a shared memory number or a group number, so that the slave station connected to the I/O device outputs to the master station.

Figure 1:
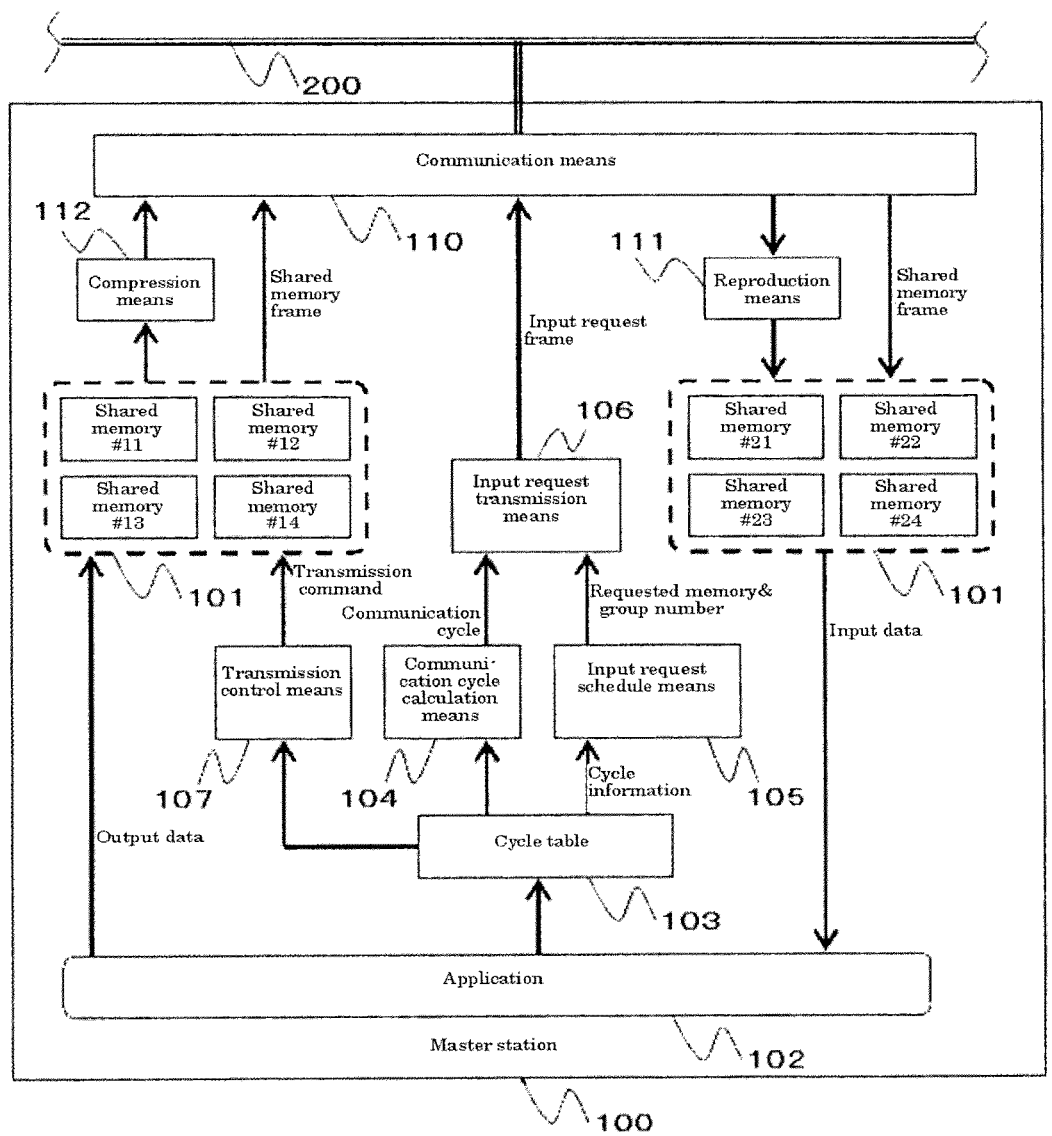
FIG. 1-1 is a configuration view of a master station 100 of a distributed I/O control system in Embodiment 1.
Figures 1, 2:
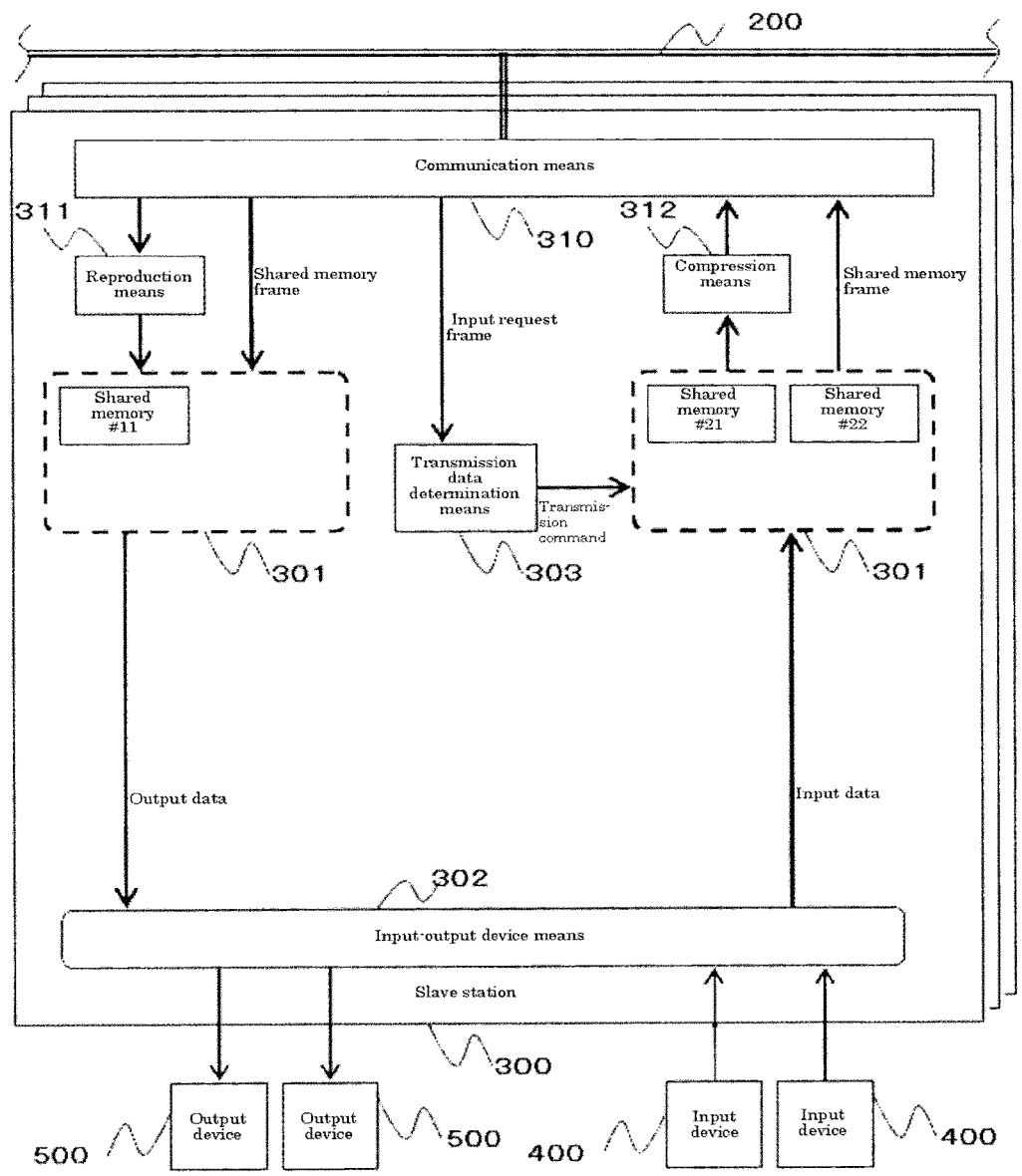
Figure 2:
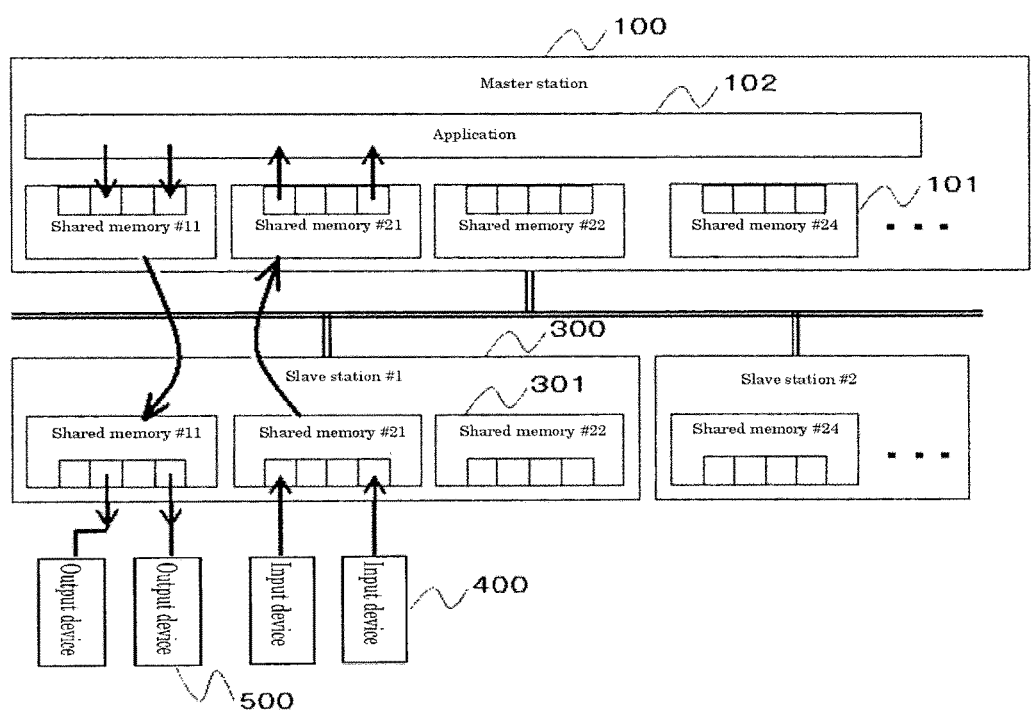

FIG. 1-1 is a configuration view of a master station 100 of a distributed I/O control system in Embodiment 1. FIG. 1-2 is a configuration view of a slave station 300 of the distributed I/O control system in Embodiment 1. In FIG. 1-1, the master station 100 is a single node, which collects input data from the slave stations 300 through a network 200, performs control calculations, and provides output data to the slave stations 300 through the network 200. Through the network 200, communication is performed between other master stations and slave stations that are not shown in this embodiment. In FIG. 1-2, the slave stations 300 are individual nodes each of which transmits input data obtained from plural input devices 400 to the master station 100. The slave station 300 also performs output operation to plural output devices 500 on the basis of output data obtained from the master station 100.

In FIG. 1-1 and FIG. 1-2, shared memories 101 and 301 in the master station 100 and the slave stations 300 store input data from the input devices 400 or output data to the output devices 500 so that data is exchanged between the master station 100 and the slave stations 300. The master station 100 and the slave stations 300 share in advance information about which shared memory and which bit thereof is assigned to information of the input device 400 or the output device 500. Although the input devices 400 and the output devices 500 are separately described in this embodiment, in a case of an integrated input/output device, input data from the input/output device or output data to the input/output device may also be exchanged through the shared memories 101 and 301 in the master station 100 and the slave stations 300.

In FIG. 1-1 and FIG. 1-2, when the master station 100 and the slave station 300 exchange information in the shared memories 101 and 301, the master station and the slave station exchange data through communication means 110 and 310 each of which is connected to the network 200. In the data exchange operation, in a case where all data in a single shared memory 301 in a slave station 300 is transmitted to a corresponding shared memory 101 in the master station 100, a shared memory frame is used for transmitting the data through the communication means 310 and 110 and the network 200. Inversely, in a case where all data in a single or plural shared memories 101 in the master station 100 is transmitted to a single or plural shared memories 301 in a slave station, a shared memory frame is used for transmitting the data through the communication means 310 and 110 and the network 200.

On the other hand, in a case where data in some portions of regions of the individual shared memories 101 and 301 is to be transmitted, communication between the communication means 110 and 310 and the shared memories 101 and 301 is performed through reproduction means 111 and 311 or compression means 112 and 312. The reproduction means 111 and 311 through which data is inputted are connected to the communication means 110 and 310 of the master station 100 and the slave station 300, to reproduce bit assignment information of an output-side shared memory 101, from the compressed data in which unnecessary data is eliminated when transmitted through the network 200, and to output the bit assignment information to the input-side shared memories 101 and 301. The compression means 112 and 312, which are connected to the communication means 110 and 310 of the master station 100 and the slave station 300 and through which data is outputted from the output-use shared memories 101 and 301, eliminate data unnecessary when transmitted, compress bit assignment information of an output-side shared memory and transmit the bit assignment information to the communication means 110 and 310. The methods for compression and reproduction will be described later.

Next, explanation specialized in FIG. 1-1 will be made. An application 102 in the master station 100 in FIG. 1-1 reads data inputted to an input-use shared memory 101, based on a shared memory frame outputted by the slave station 300 through the network 200 and the communication means 110 and based on bit assignment information outputted through the reproduction means 111, and then preforms control calculation to write output data to an output-use shared memory 101. As the need arises, information about cycles for inputting from and outputting to the slave stations 300 is provided to a cycle table 103. The cycle table 103 of the master station 100 is a list of communication cycles for individual input devices 400 and individual output devices 500 at which the master station exchanges information inputted from and outputted to the slave stations 300. In the communication cycle table 103, group information (for example, their communication cycles) of individual input devices 400 and individual output devices 500 is also written. In the communication cycle table 103, information about which shared memory is assigned to each of the input devices 400 and the output devices 500 is further described. In addition, the group information described above is not necessary to be limited to the communication cycle; the definition of the group will be described in detail later.

A communication cycle calculation means 104 of the master station 100 refers to the cycle table 103, to determine a transmission cycle of an input request frame and send the transmission cycle information of the input request frame to an input request transmission means 106. The determination method may be any method such as a method that utilizes a shortest cycle. An input request schedule means 105 of the master station 100 refers to the cycle table 103, to determine which shared memory information or which group is requested by the input request frame and to send the shared memory information and the cycle group information to the input request transmission means 106. The determination method may be any method such as a method of making constant the traffic occupancy rate of the network 102, and a method of using latest values in time with an operation timing of the application 103.

The input request transmission means 106 of the master station 100 produces an input request frame from the communication cycle information set by the communication cycle setting means 104 and from the shared memory information or the group information specified by the input request schedule means 105 to be subsequently requested, and sends the input request frame to the communication means 110. The transmission control means 107 of the master station 100 refers to the cycle table 103, to determine a timing for transmitting data of the shared memory 101 storing output control information for the output devices 500 and then issue a transmission command to the shared memory 101 to output to the communication means 110.

Through the network 200 to a slave station 300 of an output destination, the communication means 110 outputs the input request frame sent from the input request transmission means 106, the shared memory frame outputted from the output-use shared memory 101, and bit assignment information that is outputted from the output-use shared memory 101 and compressed through the compression means 112. Furthermore, the communication means 110 outputs a shared memory frame inputted through the network 200 to an input-side shared memory 101, and outputs an output frame passing through the compression means 312 to the reproduction means.

Next, explanation specialized in FIG. 1-2 will be made. A device-I/O-interface means 302 of the slave station 300 receives data outputted from an input-side shared memory 301 to control a corresponding output device 500 according to the output data. Furthermore, the device-I/O-interface means 302 periodically receives data from the input devices 400 to output the received data to an output-side shared memory 301. A transmission data determination means 303 of the slave station 300 analyzes the input request frame's contents received from the communication means 310, to issue a command for transmitting the information of a shared memory specified by the input request frame among the output-use shared memories 301 of the slave station 300 or transmitting data of a memory address or a bit corresponding to input data of the input device 400 of a group having a specific communication cycle, which is specified by the input request frame.

FIG. 2 is a view for explaining shared memories 101 and 301 in Embodiment 1. The master station 100 and the slave stations 300 share information about which shared memory and which bit thereof information of each of the input devices 400 and the output devices 500 is assigned to. Data of each of the shared memories 101 and the shared memories 301 is transmitted and received as a payload of a single transmission frame without changing its bit alignment. Shared memories 101 and 301 exist in the plural for each of input-use and output-use, and the master station 100 includes an input-use shared memory 101 and an output-use shared memory 101 corresponding to each of all slave stations 300 to be connected to the master station. In the slave station 300, an input-use shared memory 301 and an output-use shared memory 301 are included which correspond to portions of the input-use shared memory 101 and the output-use shared memory 101 of the master station, respectively; however, between slave stations 300, no input-use shared memories and output-use shared memories are provided in common.

Next, explanation will be made about the definition of a group. A group can be defined about input data from individual input devices 400; the master station 100 and the slave stations 300 share which group each piece of input data belongs to. In addition to classifying input data of the same input cycle into the same group, input data can be arbitrarily defined, regardless of nodes to which to connect the input devices 400 and the shared memories to which to assign the input data. Furthermore, a piece of input data may belong to different plural groups. In addition, plural groups may be defined.

Figure 3:
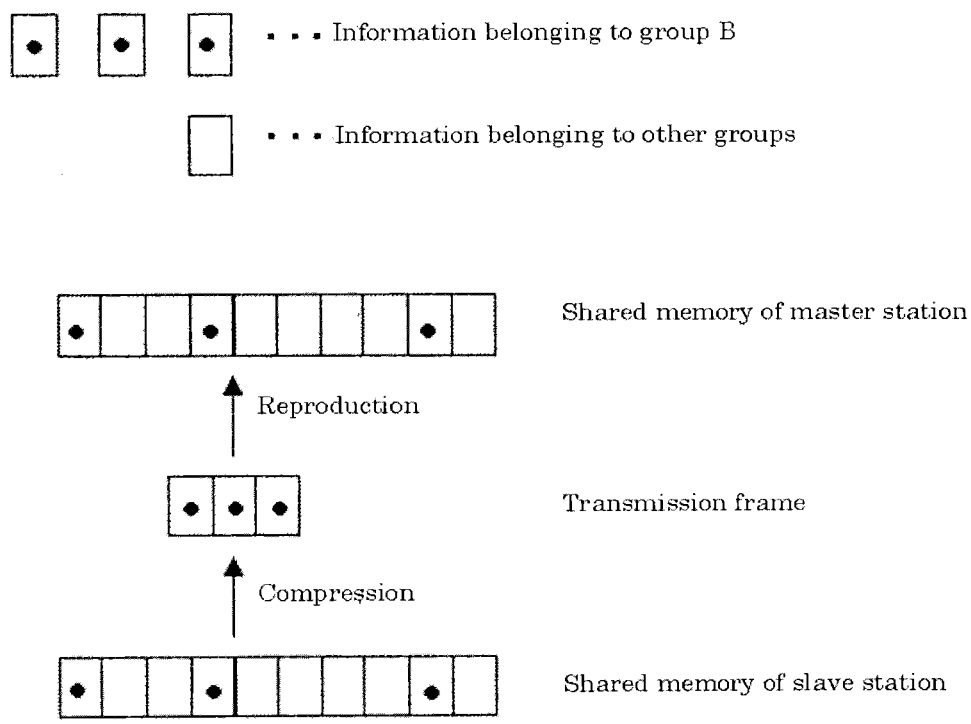
FIG. 3 is an explanation diagram about a group of output data and a compression method in compression means 112 and 312 in Embodiment 1.

FIG. 3 is an explanation diagram about groups of output data and a compression method in compression means 112 and 312 in Embodiment 1. In a case where a group B shown in FIG. 3 is specified by an input request frame, the compression means 312 omits all information in the shared memory 301 of the slave station 300, except information of the input devices 400 belonging to the group B, to output the information as a transmission frame to the communication means 310, so that the communication means 310 outputs the transmission frame to the network 200 toward the master station 100. In the master station 100 having received the transmission frame through the communication means 110, the restoration means 111 determines about which shared memory and which group the transmission frame's information is, and supplements the omitted information (not replaced information) to reproduce the original bit assignment of the shared memory. That is, the master station 100 and the slave station 300 share addresses in the shared memories 101 and 301, which correspond to the group information managed in the cycle table 103, whereby compression and reproduction are possible. Furthermore, when the master station 100 transmits information specifying the group B to the slave station 300, the compression means 112 omits all information of the output device 500, except information belonging to the group B, in the shared memory 101 of the master station 100 to output the information as a transmission frame to the communication means 110, so that the communication means 110 outputs the transmission frame to the network 200 toward the slave station 300. In the slave station 300 having received the transmission frame through the communication means 310, the restoration means 311 determines about which shared memory and which group the transmission frame's information is, and supplements the omitted information (not replaced information) to reproduce the original bit assignment of the shared memory.

Figure 4:
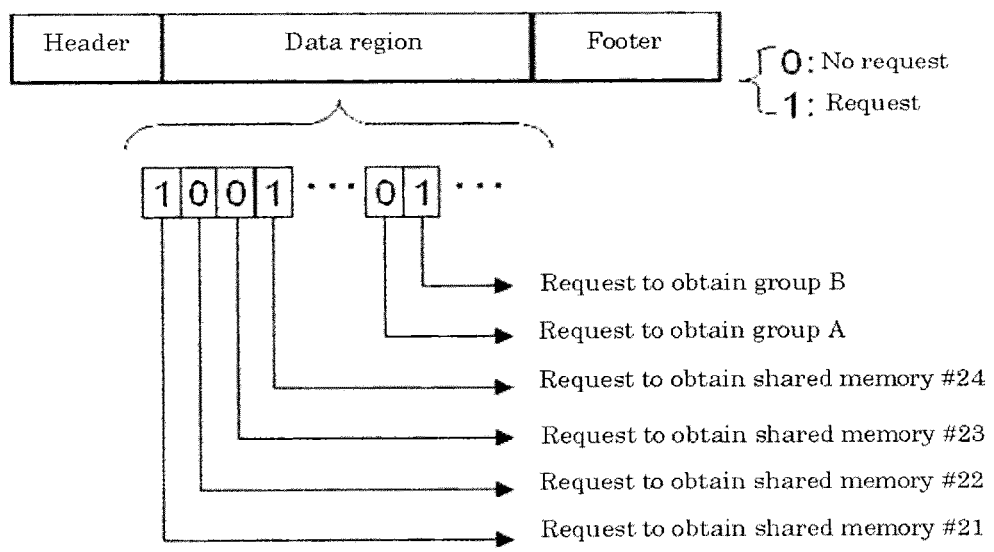
FIG. 4 is a diagram explaining an input request frame in Embodiment 1.

FIG. 4 is a diagram explaining an input request frame in Embodiment 1. The input request frame includes a header, a data region and a footer. Individual bits in the data region corresponding to the payload of the input request frame represent the presence or absence of input requests for the shared memories 101 and 301 or a group in the slave stations 300. If a corresponding bit is "1", it expresses that an input request is to be made; if "0", it expresses that an input request is not to be made.

Figure 5:
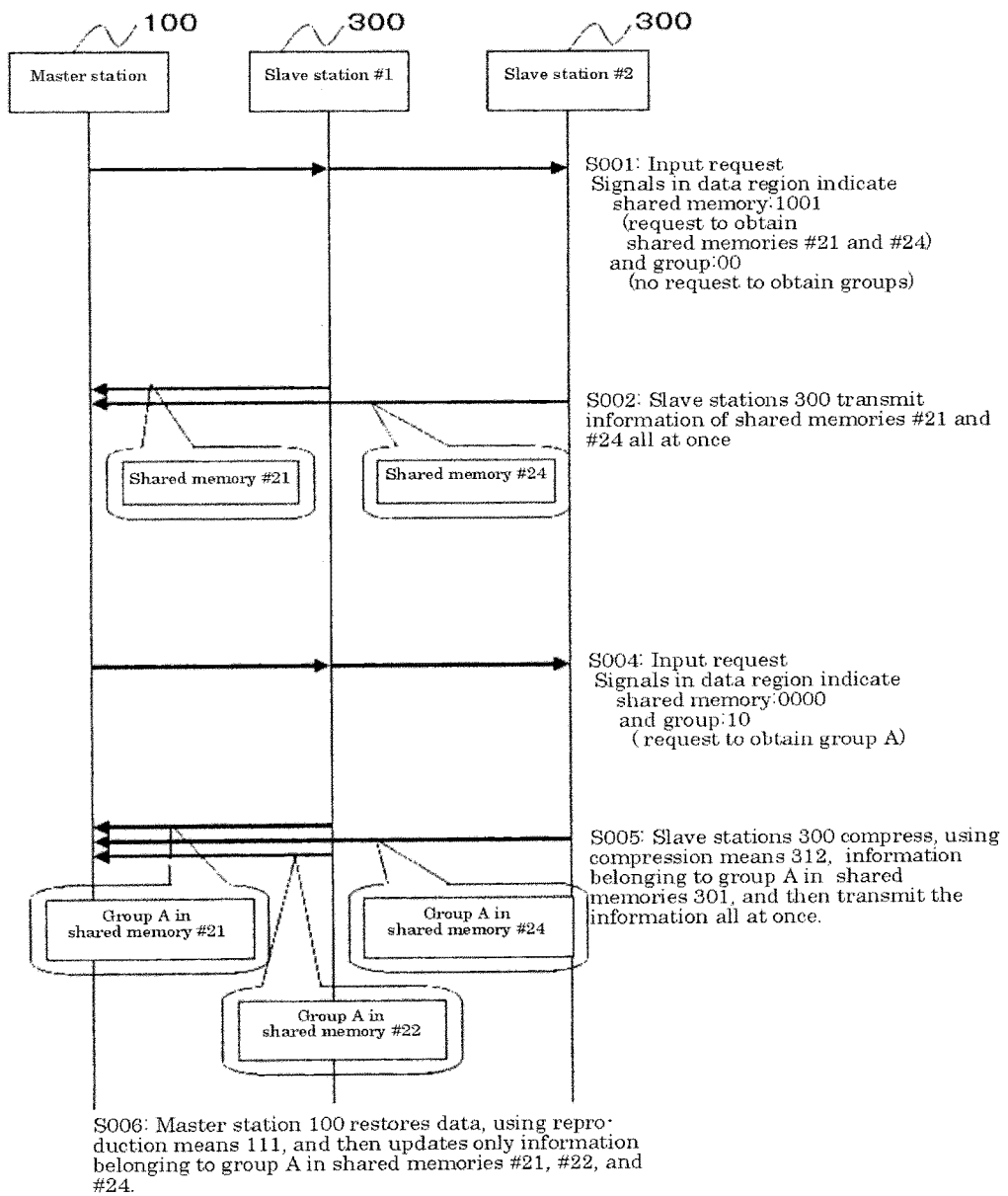
FIG. 5 is a diagram explaining an example of an input acquisition sequence in Embodiment 1.

FIG. 5 is a diagram explaining an example of an input acquisition sequence in Embodiment 1. A communication sequence will be explained using FIG. 5. In Step S001, the input request transmission means 106 of the master station 100 produces, at a defined cycle, an input request frame in which "1" is set to a bit corresponding to an input-requested shared memory or an input-requested group number, and outputs the input request frame to the communication means 110; the communication means 110 broadcasts the input request frame to the individual slave stations 300 through the network 200. As an example, it is assumed that, as shown in FIG. 2 and FIG. 4, #21 and #24 in the shared memories 301 are requested by an input request frame, but groups are not requested.

In the slave station 300, the device-I/O-interface means 302 periodically obtains input information of the input device 400 to output the input information, as input data, to an output-use shared memory 301; the output-use shared memory 301 updates information according to the input data. When the slave station 300 receives an input request frame, in Step S002, the transmission data determination means 303 analyzes which shared memory 301 or which group is requested, to issue a command for transmitting information of the requested shared memory 301 or the requested group. In this example, because only the information of the shared memory 301 is to be transmitted, the shared memory 301 stores its information to the payload of a shared memory frame all at once, to transmit the shared memory frame.

In Step S003, when the master station 100 receives the shared memory frame, the master station updates the content of a corresponding shared memory 101 all at once.

Next, explanation will be made about an example in which an input request is made for a group. In Step S004, the input request transmission means 106 of the master station 100 produces, at a defined cycle, an input request frame in which "1" is set to a bit corresponding to an input-requested group number, to output the input request frame to the communication means 110; the communication means 110 broadcasts the input request frame to the individual slave stations 300 through the network 200. As an example, it is assumed that data belonging to a group A in the shared memories 301 is requested by an input request frame shown in FIG. 4.

In Step S005, when each slave station 300 receives the input request frame, the transmission data determination means 303 analyzes which shared memory 301 or which group is requested, to issue a command for transmitting information of the requested shared memory 301 or the requested group. In this example, because only the information of the group A is to be transmitted, each shared memory 301 including the group A in the individual slave stations 300 sends its memory data to a compression means 312. The compression means 312 in the individual slave stations 300 removes data except the group A, to output the data as an output frame to the communication means 310; the communication means 310 transmits the output frame to the master station 100. At this moment, in order to indicate that the transmission is performed as a group, the transmission frame's header or payload may include information to be identified as group transmission.

In Step S006, when the master station 100 receives a transmission frame including only information of the group A, the reproduction means 111 reproduces the original bit assignment of the shared memory 301 to overwrite the shared memory 101. When reproducing the removed bits, values before the update are used for the removed bits to keep the values unchanged.

In addition, a setting is also possible by which the master station 100 performs group-by-group transmission to the slave stations 300. When transmitting, the transmission control means 107 determines whether transmission of all data in the shared memory 101 is performed, or group transmission is performed, to issue a transmission command to the shared memory 101. A transmission timing of the transmission control means 107 may be arbitrarily determined, referring to the cycle table 103. Also in a case where the master station 100 transmits data group by group, in order that the data transmission is recognized as group transmission, information may be added in the header of the transmission frame or the payload thereof; or after all information belonging to a group is transmitted, the group name may be specified with another frame. In a case of transmitting data group by group, the data may be broadcasted.

Also when transmission is performed from the master station 100 to the slave station 300, similarly to the case from the slave station 300 to the master station 100, non-transmission group information is eliminated to shorten a frame to be transmitted, using the compression means 112 of the master station 100 and the reproduction means 311 of the slave station 300.

In the configuration described above, transmission can be performed selectively only for a shared memory or a group whose update timing comes, whereby a distributed I/O system with different cycles coexisting therein can be controlled with a small amount of traffic. Furthermore, because the group information (such as communication cycles) of the individual input devices 400 and the individual output devices 500 has been set, it is possible to dynamically change the cycles so as to control the traffic. For example, if information usually obtained at a short cycle is set as group information obtained at a long communication cycle, the information can be obtained at the long cycle; conversely, if information usually obtained at a long cycle is set as group information obtained at a short communication cycle, the information can be concentratedly obtained at the short cycle.

Furthermore, because the input request is broadcasted, and then the individual slave stations 300 transmit data of the input request reception time, input values of the same timing can be collected to the master station from the input devices connected to different nodes. Furthermore, for example, in a case where a node has 5 ms-cycle-input information and 10 ms-cycle-input information all of which can be assigned to bits in a single shared memory 301, all of the 5 ms-cycle-input information is set so as to belong to a same group B and input requests are transmitted at the 5 ms cycle; and then, the shared memory 301 is requested to transmit at 10 ms intervals, and the group B is requested to transmit at the subsequent input request, i.e. at 10 ms intervals, whereby the transmission of the group B can be performed with a short frame in which the 10 ms-cycle information is eliminated by the compression means. This case requires less traffic than a case where 5 ms-cycle information and 10 ms-cycle information are bit-assigned to different shared memories 301 to each of which input request is issued, or a case where all information is bit-assigned to shared memory 301 and transmitted at 5 ms cycle without using groups. Furthermore, by storing input information of different cycles into a same shared memory, the number of the shared memories can be reduced, thereby reducing the memory resources.

As describe above, in a distributed I/O control system in which communication is performed for updating through a network 200 between shared memory 301 of a slave station 300 performing data input/output operation from input devices 400 or to output devices 500 and shared memory 101 of a master station 100 corresponding to the shared memory 301 of the slave station 300, the master station 100 includes: a cycle table 103 that defines a communication cycle with respect to each of the input devices 400 or the output devices 500 and group information with respect to the individual input devices 400 or output devices 500; an input request transmission means 106 that outputs, according to the cycle table 103, an input request frame specifying shared memory 301 and group information requested to be inputted according to the cycle table 103; a transmission control means 107 that refers to the cycle table 103 to determine a timing to transmit data of the shared memory 101 storing output data for the output devices 500 and issues a transmission command to the shared memory 101; a compression means 112 that eliminates, when the output data from the shared memory 101 is based on the group information, data unnecessary to be outputted; and a reproduction means 111 that reproduces, when data inputted from the network 200 is based on group information, data to be inputted to the shared memory 101, and the slave station 300 includes: a reproduction means 311 that reproduces, when output data from the master station 100 is based on group information, data to be inputted to the shared memory 301; a device-I/O-interface means 302 that performs data input/output operation between the input devices 400 or the output devices 500 and the shared memory 301; a transmission data determination means 303 that determines whether the input request frame from the master station 100 requests, to the shared memory 301, information of the shared memory 301 or information corresponding to the group information, and issues a command to transmit the corresponding data; and a compression means 312 that reproduces, when output data from the memory 301 is based on the group information, the output data into data for being inputted to the shared memory 301, so that the slave station transmits less data and reduces packet sizes. This can realize a distributed I/O system in which the traffic increase is curbed and necessary information is obtained in real time.

In addition, when data of plural groups is transmitted, different groups belonging to a same shared memory may be transmitted by a single frame, not by multiple frames each separated for the individual groups. Furthermore, in a case where pieces of information belonging to a same group exist across plural shared memories in a same slave station, the information pieces on the same group may be integrated into a single frame as long as the information pieces do not exceed the capacity of the payload. A data order by which to integrate plural groups is determined according to the order of their group numbers or their shared memory numbers, and is shared between the master station and the slave stations.

Furthermore, when plural groups are simultaneously requested to be inputted and transmitted, there sometimes occurs a case the same plural pieces of data are transmitted in the same frame. Here, the reproduction means may perform error check according to whether or not values extracted by the plural groups as the same information are the same.

Embodiment 2

Explanation will be made about a configuration of Embodiment 2, which includes all components of Embodiment 1, and further includes, in the slave station, a process for an event occurrence that requires on-demand communication.

Figure 6:
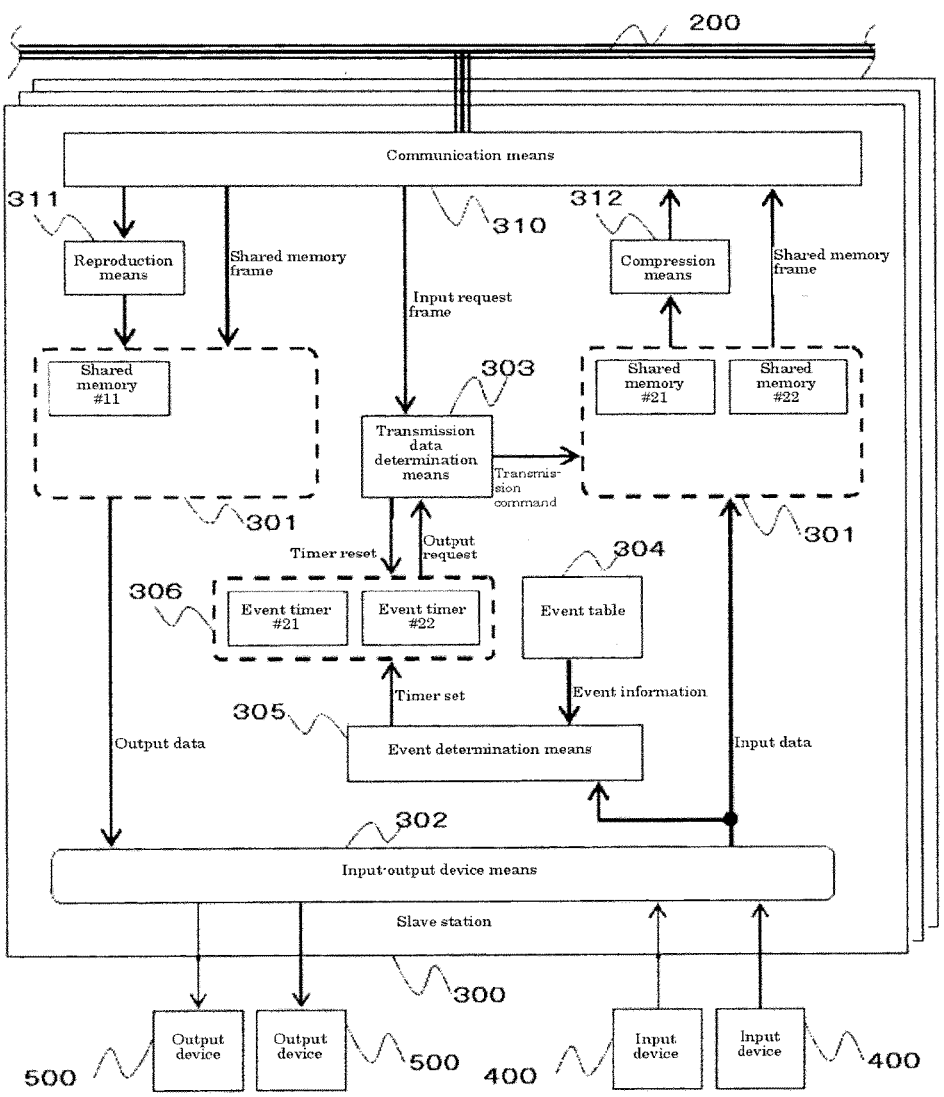
FIG. 6 is a configuration view of a slave station 300 in Embodiment 2.

A master station 100 has the same configuration as that described in FIG. 1-1 and Embodiment 1; and a slave station 300 has the same configuration described in FIG. 1-2 and Embodiment 1 but further includes a component, about which explanation will be made using FIG. 6. FIG. 6 is a configuration view of the slave station 300 in Embodiment 2.

Explanation will be made only about the components added to Embodiment 1. In an event table 304 of the slave station 300, registered are: specific patterns of input data, with which the input data inputted from the input devices 400 through the device-I/O-interface means 302 is detected as events, and which are assigned to specific input devices 400, respectively; and, grace times each of which is from a specific event detection till input data having generated the event to be transmitted to the master station 100. When obtaining the input data from the input device 400, an event determination means 305 of the slave station 300 determines, referring to the event table 304, whether or not an event occurs. When the event occurrence is confirmed, a grace time is set to an event timer 306 corresponding to a shared memory 301 to which to store the input data corresponding to the event of the input device 400. When the grace time is set, the event timer 306 of the slave station 300 starts counting down (decrement); when reaching zero, the event timer issues an output request of the corresponding shared memory 301 to the transmission data determination means 303.

Figure 7:
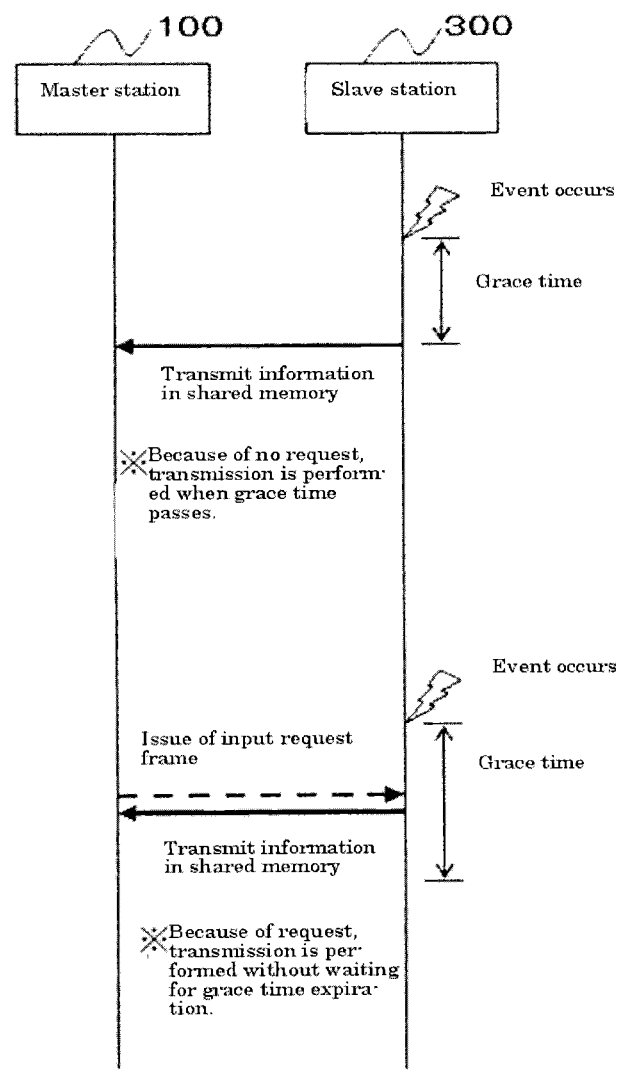
FIG. 7 is a diagram of operations when an event occurs at the slave station 300 in Embodiment 2.

FIG. 7 is a diagram that illustrates operations of the slave station 300 in Embodiment 2 when an event occurs. In the upper side of the figure, a case is illustrated in which an event is generated by input data from the input device 400, and there is no input request frame from the master station 100 until the grace time elapses; in the lower side, a case is illustrated in which an event is generated by input data from the input device 400, and there is an input request frame from the master station 100 until the grace time elapses.

In the upper side case, when the event determination means 305 determines, referring to the event table 304, that an event has occurred by input data from the input device 400, a grace time is set to an event timer 306 corresponding to a shared memory 301 to which to store the input data corresponding to the event of the input device 400. When the grace time is set, the event timer 306 starts counting down (decrement); when reaching zero, the event timer issues an output request of the corresponding shared memory 301 to the transmission data determination means 303. The shared memory 301 performs transmission to the master station 100, using a shared memory frame or using a transmission frame through the compression means 312.

In the lower side case, when the event determination means 305 determines, referring to the event table 304, that an event has occurred by input data from the input device 400, a grace time is set to an event timer 306 corresponding to a shared memory 301 to which to store the input data corresponding to the event of the input device 400. When the grace time is set to the event timer 306, the event timer starts counting down (decrement). Before the event timer 306 reaches zero, the transmission data determination means 303 receives an input request frame from the master station 100.

Then, when issuing a command of transmitting data of a specified shared memory 301 or a specified group including event information, the transmission data determination means 303 resets the event timer 306 of the specified shared memory. Therefore, in a case where an input request of a shared memory 301 or a group including the event information is issued during a period to wait for expiration of the grace time from an event occurrence, data of the shared memory 301 or the group including the event information is transmitted to the master station 100, without waiting for the grace time to pass, with a shared memory frame or a transmission frame through the compression means 312, and the event timer 306 is reset.

Figure 8:
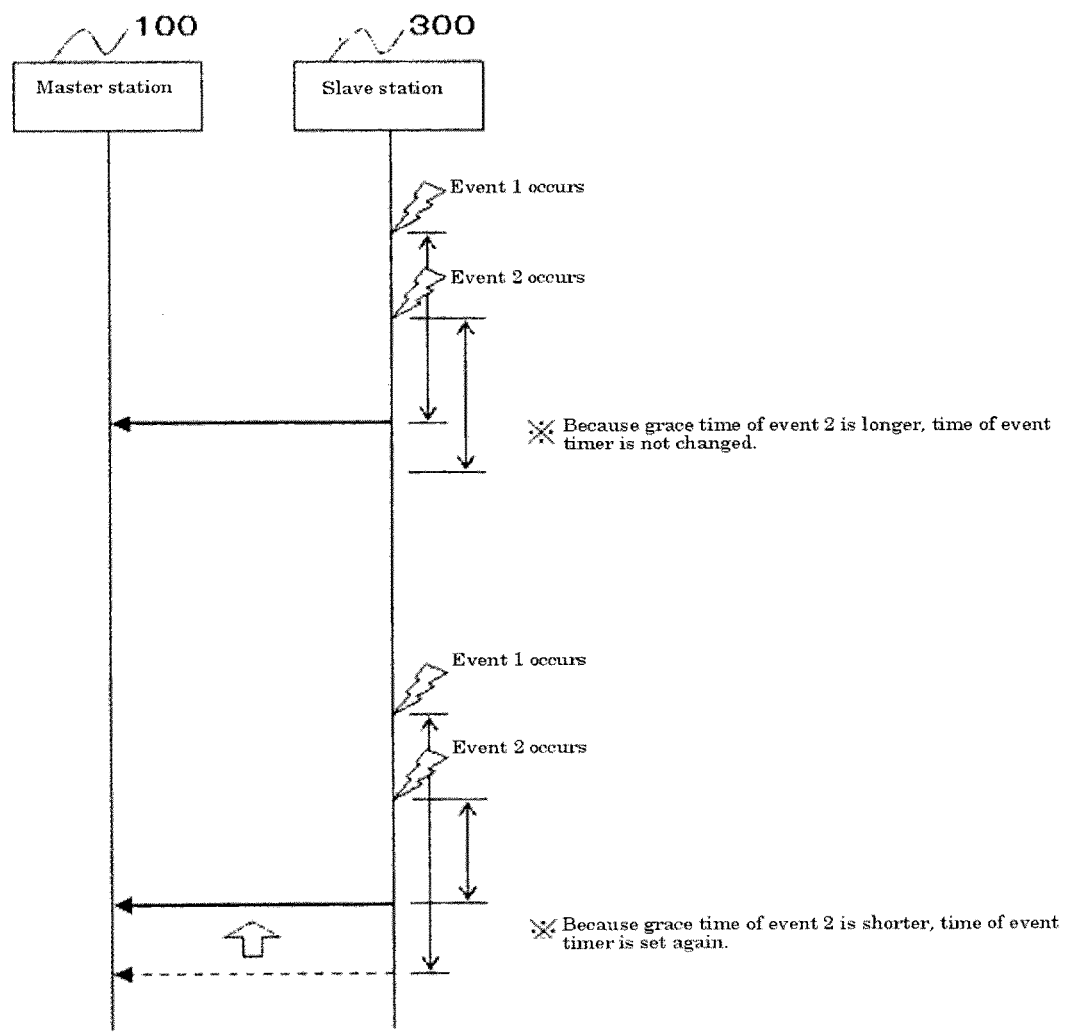
FIG. 8 is a diagram of operations when plural events occur at the slave station 300 in Embodiment 2.

Next, explanation will be made about an operation in a case where plural events are generated by input data from a single input device 400 or plural input devices. FIG. 8 is a diagram that illustrates operations when plural events occur in the slave station 300 in Embodiment 2. In the upper side, a case is illustrated in which input data from the input device 400 generates an event 1, and before its grace time elapses, an event 2 is generated whose grace time expires after the grace time of the event 1 elapses; in the lower side, a case is illustrated in which input data from the input device 400 generates an event 1, and before its grace time elapses, an event 2 is generated whose grace time expires before the grace time of the event 1 elapses.

In the upper case, when the event determination means 305 determines, referring to the event table 304, that an event has occurred by input data from the input device 400, a grace time is set to an event timer 306 corresponding to a shared memory 301 to which to store the input data corresponding to the event of the input device 400. When the grace time is set, the event timer 306 starts counting down (decrement). In a case where another event occurs during a waiting period for expiration of the grace time, the event determination means 305 compares the remaining of the previously set event grace time with a grace time for a new event. If the remaining time of the previously set event is shorter, the remaining operations are left unchanged. That is, when the event timer 306 reaches zero, the event timer issues an output request of the corresponding shared memory 301 to the transmission data determination means 303, and data of the shared memory 301 is transmitted to the master station 100, using a shared memory frame or using a transmission frame through the compression means 312.

In the lower case, when the event determination means 305 determines, referring to the event table 304, that an event has occurred by input data from the input device 400, a grace time is set to an event timer 306 corresponding to a shared memory 301 to which to store the input data corresponding to the event of the input device 400. When the grace time is set, the event timer 306 starts counting down (decrement). In a case where another event occurs during a waiting period for expiration of the grace time, the event determination means 305 compares the remaining of the previously set event grace time with a grace time for a new event. If the grace time of the latter event is shorter, the event determination means 305 again sets the event timer 306 to the latter event's grace time. When the event timer 306 reaches zero, the event timer issues an output request of the corresponding shared memory 301 to the transmission data determination means 303, and data of the shared memory 301 is transmitted to the master station 100, using a shared memory frame or using a transmission frame through the compression means 312.

In the configuration described above, when a new event occurs during a waiting period for expiration of an event grace time, the remaining grace time for the previously-occurred event is compared with a grace time for the new event; this can realize, using a single event timer 306, a mechanism for reducing traffic increase even when events frequently occur. Furthermore, in a case where data of a shared memory is transmitted by an input request from the master station during a period to count down the grace time, the event timer 306 is reset, so that the request-response communication which the master station 100 periodically performs is substituted for the on-demand communication; this can realize a method of reducing increased traffic, using a single event timer 306. Furthermore, even in a case where the slave station 300 does not have the event timers 306 for controlling communication cycles, operations to the input requests from the master station 100 are regular during a waiting period for expiration of a grace time; therefore, communication cycles can be dynamically changed at an event occurrence.

As described above, the slave station includes: an event table in which specific patterns of input data assigned as events for respective input devices, and grace times from the specific event detection till input data having generated the event is to be transmitted to the master station 100 are registered; an event determination means 305 that refers, from input data through the device-I/O-interface means 302 from the input devices 400, to the event table to determine whether or not an event occurs and thereby perform a timer setting operation to an event timer 306 corresponding to a shared memory 301; and the transmission data determination means 303 that issues a command to the shared memory 301 to transmit to the master station 100 according to an input request from the master station 100 or an output request from the event timer 306, so that a distributed I/O system can be realized in which traffic increase is curbed by a small number of timer resources even in a system where on-demand communication coexists with periodic communication.

Embodiment 3

In Embodiment 3, a configuration will be explained which includes, in addition to the components of Embodiment 1 and Embodiment 2, a process by which the master station obtains inputs from the slave stations at a non-integer multiple of the input request frame communication cycle. A master station 100 includes the components in FIG. 1-1 and Embodiments 1 and 2, and further includes an additional component; the configuration of the master station will be explained using FIG. 9-1. A slave station 300 includes the components in FIG. 1-2 and FIG. 6 and in Embodiments 1 and 2, and further includes an additional component; the configuration of the slave station will be explained using FIG. 9-2.

Figures 1, 9:
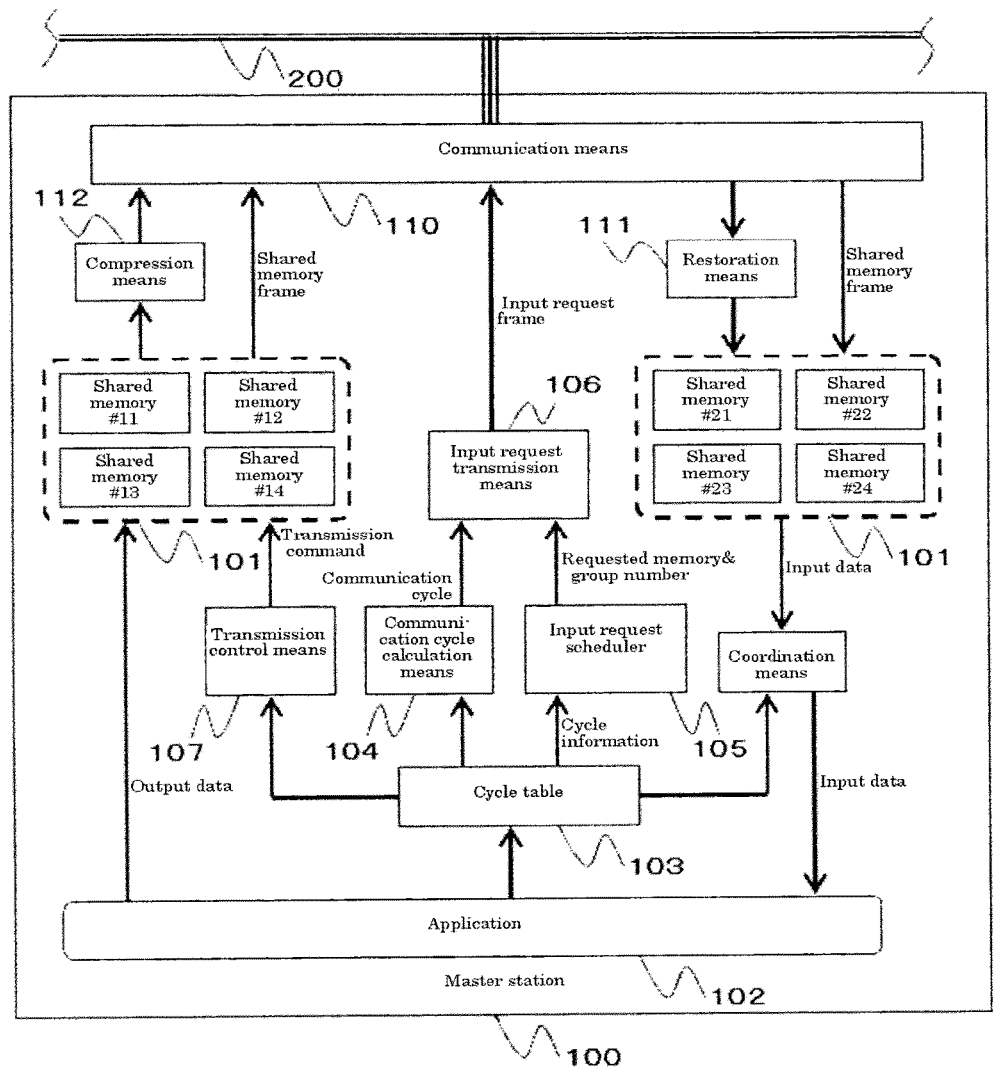
Figures 2, 9:
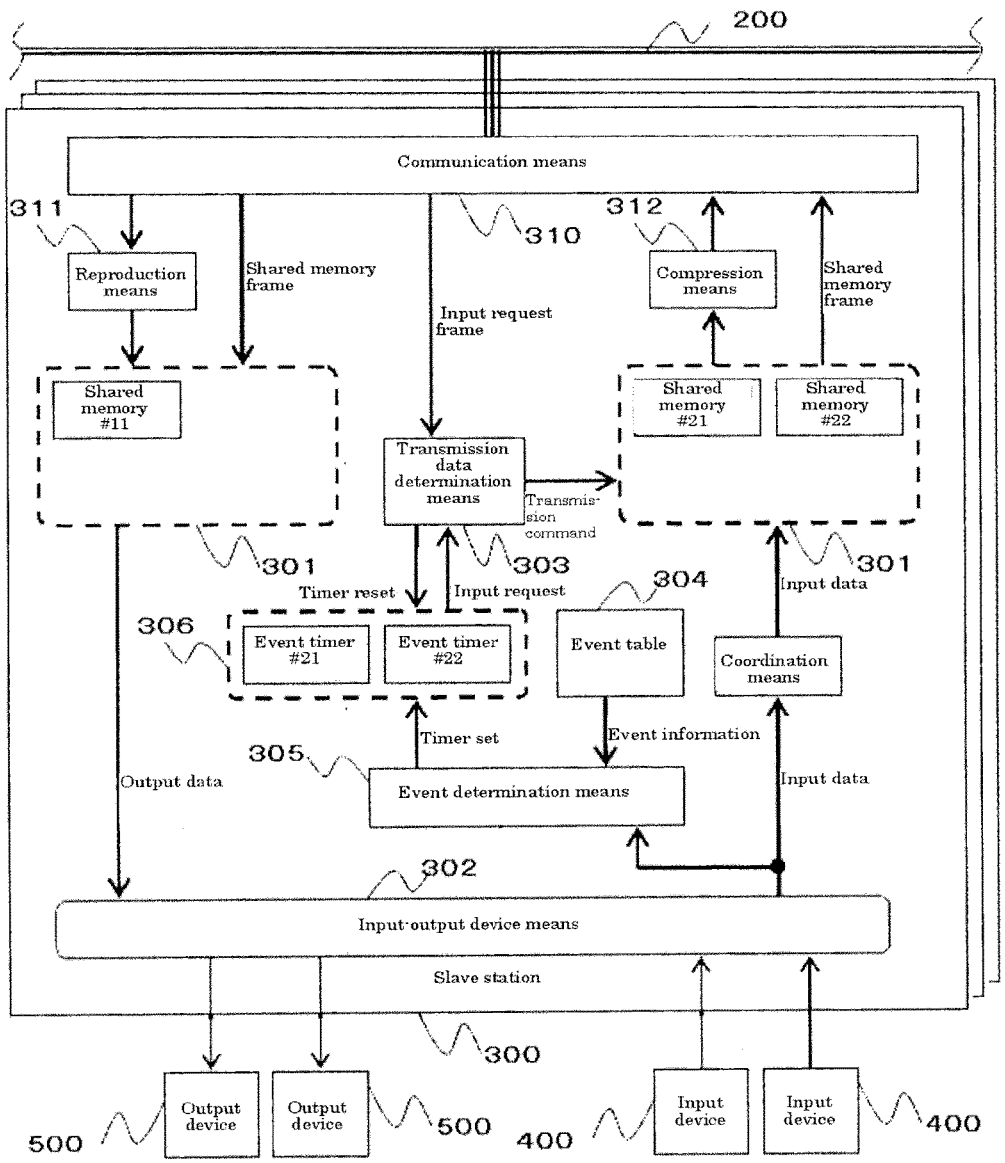

FIG. 9-1 is a configuration view of a master station 100 of a distributed I/O control system in Embodiment 3. FIG. 9-2 is a configuration view of a slave station 300 of the distributed I/O control system in Embodiment 1. In FIG. 9-2, a coordination means 313 of the slave station 300 filters data inputted to the shared memory 301 being always updated through the device-I/O-interface means 302 with inputs from the individual input devices 400, and coordinates the timing of reflecting in the shared memory 301 so that input data is transmitted at respective input cycles defined for the input data from the input devices 400. In FIG. 9-1, a coordination means 113 of the master station 100 coordinates an update timing so that values in the shared memory 101 to be updated in synchronism with the communication cycle are updated at a defined input cycle when referred to by the application 102.

Figure 10:
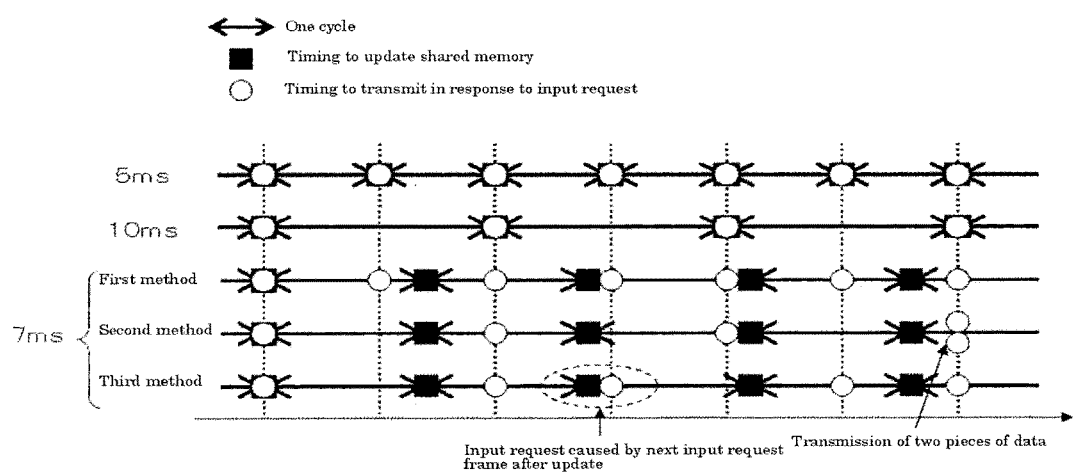
FIG. 10 is an explanation diagram of update timings and transmission timings of a shared memory 301 in the slave station 300 in Embodiment 3.

FIG. 10 is an explanation diagram of update timings and transmission timings in the shared memory 301 in the slave station 300 in Embodiment 3. In a case where the input cycle is the input request frame's communication cycle or the multiple thereof, the slave station 300 transmits the information of the shared memory 301 storing the input data at a timing when receiving an input request, whereby the information of the shared memory 301 in accordance with the input cycle can be provided to the master station 100. With respect to a case where the input cycle is not the multiple of the input request frame's communication cycle, for example, the input frame's transmission cycle is 5 ms and the input cycle is 7 ms, three methods for transmitting the inputs to the master station will be explained below.

In a first method, the master station requests inputting at a cycle shorter than the input cycle. A coordination means 313 of the slave station 300 performs buffering to update input values of the shared memory 301 at every 7 ms. The input request schedule means 105 of the master station 100 requests and obtain, at 5 ms cycle, the shared memory 101 storing a 7 ms cycle input. The shared memory 101 of the master station 100 is updated at 5 ms cycle, but is temporarily buffered by the coordination means 113 of the master station 100, which thereby causes the shared memory to appear as if to be updated at 7 ms cycle for the application 102. In a case where the shared memory in which other 5 ms cycle information is stored has a marginal region to store the 7 ms information, the 7 ms information can be transmitted incidentally with the 5 ms cycle information, thereby reducing the traffic.

In a second method, the master station requests inputting at a cycle longer than the input request; therefore, if multiple update operations are performed in a single cycle, the data of the multiple update operations is transmitted together. The coordination means 313 of the slave station 300 performs buffering to update input values in the shared memory 301 at every 7 ms. In each of the shared memories 101 and 301, an area is reserved for storing two pieces of 7 ms cycle data. The input request schedule means 105 of the master station 100 requests and obtains, at 10 ms cycle, data of the shared memory 101 storing 7 ms cycle inputs. In a case where inputs are obtained two times in the same cycle, the two pieces of data are stored in the shared memory and transmitted. The shared memory 101 of the master station 100 is updated at 10 ms cycle, but the update data is temporarily buffered by the coordination means 113 of the master station 100, which thereby causes the shared memory to appear as if to be updated at 7 ms cycle for the application 102. Similarly, in a case where 7 ms cycle information is to be stored in the shared memories requested at 15 ms cycle or 20 ms cycle, area reservation for three pieces of data is performed or the like so that all data updated within a requested cycle can be transmitted.

Therefore, the coordination means 123 of the master station 100 temporarily performs, similarly to the first method, buffering to update at 7 ms cycle, but transmission is performed at 10 ms cycle; compared to the first method, this brings more delay in operations from input acquisition till provision to the application 102, but can reduce the traffic.

In a third method, dynamic change in cycle or selective use between the shared memory and the group is used for transmitting to the master station with the next input request frame after updating the shared memory. The coordination means 313 of the slave station 300 performs buffering to update input values in the shared memory 301 at every 7 ms. In order to obtain the 7 ms cycle input stored in the shared memory 101, the input request schedule means 105 of the master station 100 either requests inputting at 5 ms cycle in a case where update is made within 5 ms after obtaining the last requested memory, or requests inputting at 10 ms cycle in a case where update is not made within 5 ms after obtaining the last requested memory. The shared memory 101 of the master station 100 is updated at 5 ms cycle or 10 ms cycle according to the request of the input request schedule means 105, but the update is temporarily buffered by the coordination means 113 of the master station 100, which thereby causes the shared memory to appear as if to be updated at 7 ms cycle for the application 102. Therefore, transmission can be performed selectively at 10 ms cycle or 5 ms cycle, whereby the traffic can be reduced and the transmission delay time stays unchanged in comparison to the transmission at 5 ms cycle only.

As describe above, the master station 100 and the slave station 300 are provided with the cycle coordination means 113 and 313. Even when input data being requested to be inputted at a non-multiple of the communication cycle is transmitted or when input data obtained at an exact cycle is transmitted to the master station at a different transmission cycle, the coordination means 113 and 313 perform buffering when transmitting to the application 102 so that the exact cycle can be reproduced, which thereby can realize a distributed I/O system in which the input data is provided to the application 102 in accordance with the input cycle.

INDUSTRIAL APPLICABILITY

As describe above, the distributed I/O control system and the control method therefor according to the present invention are useful for a communication system in which a master station and a slave station (multiplex transmission device) connected to plural I/O devices are included and whose connection network is in a state where communication of other stations occurs; and the distributed I/O control system and the control method therefor are especially suitable to a distributed I/O control system that deals with communication cycles to suppress the communication band.

NUMERAL EXPLANATION 100 master station
101 shared memory
102 application
103 cycle table
104 communication cycle calculation means
105 input request schedule means
106 input request transmission means
107 transmission control means
110 communication means
111 reproduction means
112 compression means
113 coordination means
200 network
300 slave station
301 shared memory
302 device-I/O-interface means
303 transmission data determination means
304 event table
305 event determination means
306 event timer
310 communication means 311 reproduction means
312 compression means
313 coordination means
400 input device
500 output device

The invention claimed is:

1. A master station of a distributed input/output (I/O) control system which updates data through a network between a shared memory of a slave station and a shared memory of the master station, the shared memory of the master station corresponding to the shared memory of the slave station, and the slave station performs input and output operation of data with a plurality of input or output devices, the master station comprising:
- a cycle table in which a communication cycle and group information are defined with respect to each of the input devices or the output devices;
- an input request transmitter that outputs, according to the communication cycle, an input request frame specifying the shared memory of the slave station and the group information; and
- a reproducer that reproduces, when input data received from the network is specified by the group information, data to be inputted to the shared memory of the master station, the input data received from the network having a portion omitted, the reproducer reproducing the portion omitted from the input data received from the network based on the group information.

2. A distributed input/output (I/O) control system which updates data through a network between a shared memory of a slave station and a shared memory of a master station, the shared memory of the master station corresponding to the shared memory of the slave station, and the slave station performs input and output operation of data with a plurality of input or output devices, the distributed I/O control system comprising:
- the master station comprising:
  - a cycle table in which a communication cycle and group information are defined with respect to each of the input devices or the output devices;
  - an input request transmitter that outputs, according to the communication cycle, an input request frame specifying the shared memory of the slave station and the group information; and
  - a reproducer that reproduces, when input data received from the network is specified by the group information, data to be inputted to the shared memory of the master station, the input data received from the network having a portion omitted, the reproducer reproducing the portion omitted from the input data received from the network based on the group information; and
- the slave station comprising:
  - a transmission data selector that determines whether an input request content specified by the input request frame from the master station includes all information in the shared memory in the slave station, or includes information corresponding to the group information, and issues a command to transmit corresponding output data; and
  - a compressor that compresses, when output data from the shared memory in the slave station is specified by the group information, the output data into the input data that is less than all of the data to be inputted to the shared memory of the master station.

3. The distributed I/O control system according to claim 2, wherein the master station further comprises:
- a transmission controller that refers to the cycle table to determine a timing to transmit data of the shared memory of the master station that stores output data for the output devices and issues a transmission command to the shared memory;
and the slave station further comprises:
- a device-I/O-interface that outputs output data from the shared memory of the slave station to the output devices, and inputs input data from the input devices to the shared memory of the slave station;
- an event table in which a specific pattern of the input data assigned as an event for each input device, and a grace time from detecting the event to outputting the input data on the generated event to the master station, are registered;
- an event selector that refers, on the basis of input data through the device-I/O-interface from the input devices, to the event table to determine whether or not an event occurs and performs a timer setting operation to an event timer corresponding to the shared memory of the slave station; and
- the transmission data selector of the slave station that issues a command to the shared memory of the slave station to transmit to the master station in response to an input request from the master station or an output request issued when the event timer expires.

4. The distributed I/O control system according to claim 2, wherein the cycle table has a plurality of communication cycles, some of which are a non-integer multiple of a predetermined cycle,
the slave station further comprises a coordinator which updates input data in the shared memory of the slave station at the non-integer multiple cycle of the predetermined cycle,
and the master station further comprises a coordinator which outputs, from the shared memory of the master station updated corresponding to the input data through the network at the non-integer multiple cycle of the predetermined cycle, the input data being input to an application.

5. The distributed I/O control system according to claim 2, wherein the cycle table has a plurality of communication cycles,
and the input request transmitter outputs an input request frame specifying all information of the shared memory of the slave station at a cycle equal to a least common multiple of the plural communication cycles, and outputs the group-information basis input request frame at cycles other than the least common multiple.

6. The distributed I/O control system according to claim 2, wherein the master station further comprises a compressor that removes, when the output from the shared memory of the master station is specified by the group information, data unnecessary to be outputted, and
the slave station further comprises a reproducer that reproduces, when output data from the master station is specified by the group information, data so as to be inputted to the slave station's shared memory of the slave station.

7. A slave station of a distributed input/output (I/O) control system which updates data through a network between a shared memory of the slave station and a shared memory of a master station, the shared memory of the master station corresponding to the shared memory of the slave station, and the slave station performs input and output operation of data with a plurality of input or output devices, the slave station comprising:

a transmission data selector that determines whether an input request content specified by an input request frame from the master station includes all information in the shared memory in the slave station, or includes information corresponding to the group information, and issues a command to transmit the corresponding output data; and a compressor that omits, when output data from the shared memory in the slave station is specified by the group information, a portion of the output data to generate data to be inputted to the shared memory of the master station, the portion of the output data omitted being reproducible from the data to be inputted to the shared memory of the master station based on the group information.

8. A distributed input/output (I/O) control method which updates data through a network between a shared memory of a slave station and a shared memory of a master station, the shared memory of the master station corresponding to the shared memory of the slave station, and the slave station performs input and output operation of data with a plurality of input or output devices, the distributed I/O control method comprising:

outputting, from the master station, an input request frame specifying shared memory of the slave station and group information, according to a communication cycle and the group information defined with respect to each of the input devices or the output devices, the communication cycle and the group information being defined in a cycle table;

determining, at the slave station, whether an input request content specified by the input request frame includes all information in the shared memory in the slave station, or includes information corresponding to the group information, and issues a command to transmit the corresponding output data;

compressing, by the slave station, when output data from the shared memory in the slave station is specified by the group information, the output data into less than all data to be inputted to the shared memory of the master station; and reproducing, by the master station, when input data received from the network is specified by the group information, data to be inputted to the shared memory of the master station, the input data received from the network having a portion omitted, the portion omitted being reproduced from the input data received from the network based on the group information.

* * * * *